UNITED STATES PATENT OFFICE.

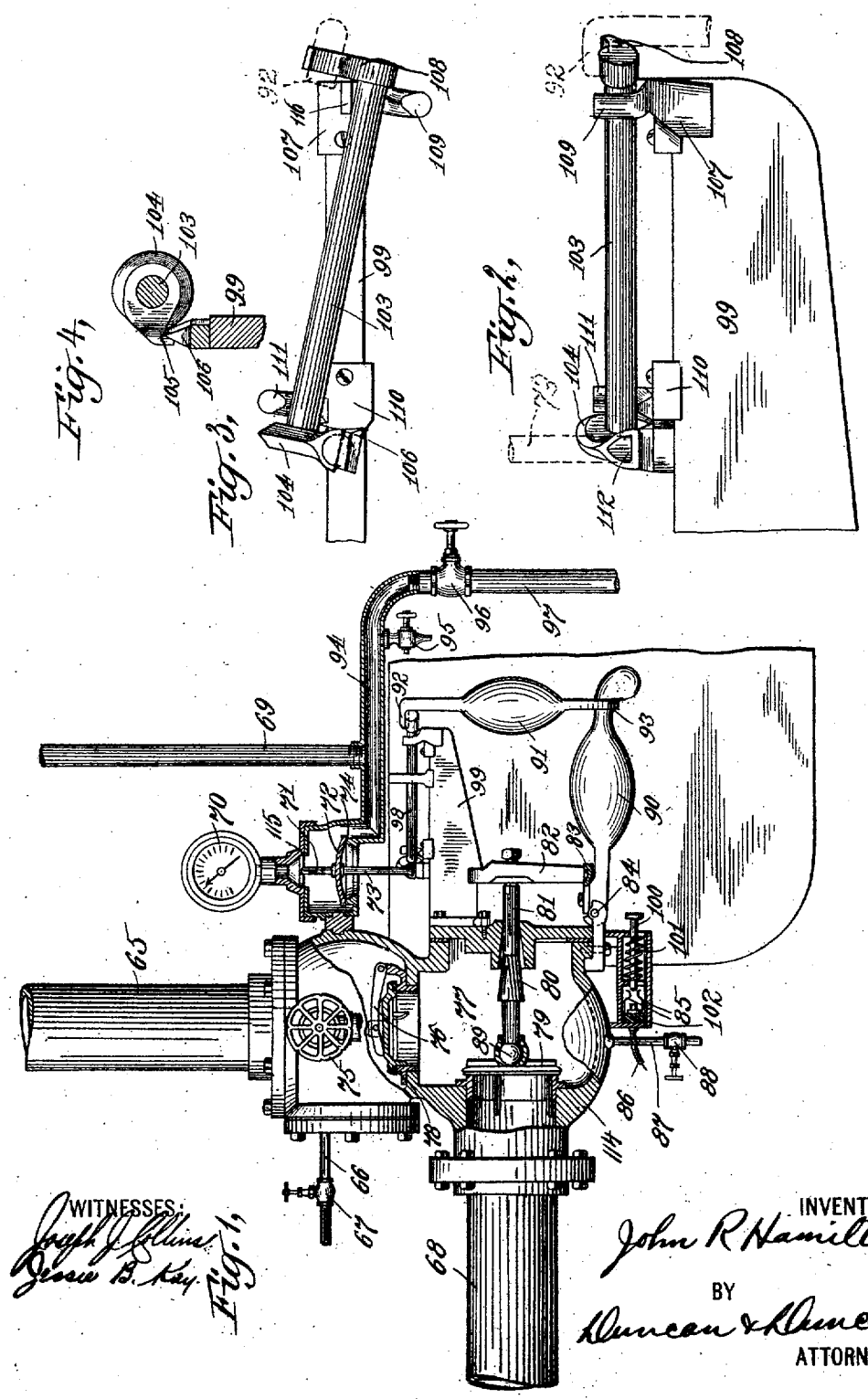

JOHN R. HAMILTON, OF MOUNT KISCO, NEW YORK, ASSIGNOR TO MANUFACTURERS AUTOMATIC SPRINKLER COMPANY, OF NEW YORK, N. Y., A CORPORATION OF NEW YORK.

DRY-PIPE VALVE.

No. 857,276.

Specification of Letters Patent.

Patented June 18, 1907.

Application filed February 6, 1906. Serial No. 299,742.

*To all whom it may concern:*

Be it known that I, JOHN R. HAMILTON, a citizen of the United States, and a resident of Mount Kisco, in the county of Westchester and State of New York, have invented certain new and useful Improvements in Dry-Pipe Valves, of which the following is a specification taken in connection with the accompanying drawings, which form a part of the same.

This invention relates to automatic sprinkler devices and relates especially to dry pipe valves used in automatic sprinkler systems.

In the accompanying drawings showing an illustrative form of this invention and in which the same reference numeral refers to similar parts in the several figures, Figure 1 is a side view partly in section showing the valve in set position. Fig. 2 is an enlarged view of parts of the same. Fig. 3 is a top view. Fig. 4 is a side sectional view of these details.

In the illustrative embodiment of this invention shown in the drawings, the casing 114 is adapted to be connected with an inlet pipe and supply pipe leading to the distributing system. This inlet pipe 68 is shown in the position in which the device would be used and the supply pipe 65 is also indicated in operative position, this supply pipe leading to a distributing system provided with sprinkler heads or the like, as is well known in this art and from which the air pipe 69 descends. The water valve 79 is indicated as arranged within the casing and as firmly seated so as to close the opening from the inlet pipe into the chamber 77 of the casing. This valve may be swivelingly mounted on the valve rod 81 by the ball joint 89, if desired, and as indicated the valve rod may be provided with the plug 80 of conical form to firmly seat within the corresponding hole in the casing through which the valve rod loosely extends. The valve chamber 77 within this casing may be drained by the pipe 87 and valve 88 so as to be emptied and kept clear of any water. The check valve 78 may be mounted on the pivoted valve arm 76 to normally close the top of this chamber 77 and prevent the escape of air pressure from the supply pipe 65 and distributing system. A drain valve 75 may be provided and also the test valve 67 in the pipe 66.

The air pipe 69 connects with the pipe 94 which is provided with the drain valve 96 and drain pipe 97 and also with the test cock 95. In this way the air pipe connects with the air chamber 115 which may be provided with the gage 70 and in which is mounted the air valve 72 secured upon the stem 73, the upper portion 71 of this stem which may be suitably guided in any desired way maintaining the alinement of the valve and stem. This air valve and stem coöperate with the releasable holding devices which normally maintain the water valve in closed position as indicated, but which in the event of fire release this valve and admit water to the chamber 77 and distributing system. The rod 81 may be held in position by a suitable detent 82, the upper end of which engages as indicated a notch in the support 99, while the lower end of this detent is engaged by a link or catch 83, the other end of which is held by the weight lever 90 which swings about the pivot 84. The outer end of this weight lever is supported by the lower end 93 of the link 91 which may also be weighted as indicated, the hook 92 on the upper end of this link preferably engaging an arm 108 on the rock lever 103.

The other end of this rock lever may be provided, as indicated, with an enlarged head 104 and with the socket 112 in which the stem 73 of the air valve is seated. As it is sometimes desirable to have the valve stem and hook on the link in line with the support 99 as they are constructed in some existing equipment, the rock lever may be readily mounted in an oblique position by providing the yokes 109, 116 and 11, preferably of V-sectioned material, so that they project in opposite directions from the brackets 107 and 110 by which they may be readily secured to the support 99. The alining lug 106 is preferably formed in the bracket 110 and a coöperating seat may be formed in the head below the socket 112 or other means may coöperate with the lever to prevent accidental displacement of the valve stem. The enlarged head on the rock lever tends to prevent the irregular resetting of the valve after it has operated and the partially inclosed socket 112 in which the stem engages is very effective in connection with the alining lug and seat or other means in preventing the resetting of the water valve and releasable holding devices after their emergency operation until the air pipe 69 has been completely drained of water and the air valve 72 raised so as to place the stem 73 in the socket in the proper manner.

The shape of the parts are such as to minimize corrosion and give reliable emergency operation of the device in case of fire under which conditions, as is well understood, the pressure in the air pipe is decreased to such an extent that the air valve is raised by the weighted levers and links, the rock lever is rotated and the hook 92 entirely released therefrom, so that the link and lever 90 fall, forcing the electric switch plug 100 inward against the action of the spring 101 so that the contacts 85 are electrically connected, giving an appropriate alarm signal over the cable 86. The link 83 and pin 82 are also released allowing the valve rod 81 to move outward under the pressure of water on the valve 79 so that water can readily get access to the distributing system.

Having described this invention in connection with an illustrative embodiment thereof, to the details of which I do not desire to be limited, what I claim as new and what I desire to secure by Letters Patent is set forth in the appended claims.

1. In dry pipe valves, a valve casing for connection with an inlet pipe, a water valve in said casing provided with a protruding valve rod, a check valve in said casing to control the outlet to supply pipe and distributing system, an air chamber to be connected through an air pipe with said distributing system, an air valve in said chamber provided with a protruding stem, a support, brackets secured to said support and provided with yokes projecting on opposite sides of said support, a rock lever having an arm and an enlarged head provided with a socket and obliquely mounted above said support in said yokes, an alining lug on said bracket below said valve stem and releasable holding devices engaging said valve rod and said arm.

2. In dry pipe valves, a casing, a water valve in said casing to control the inlet of water thereto, an air chamber to be connected with a distributing system, an air valve in said chamber and provided with a stem, a support, brackets secured to said support and provided with yokes projecting on opposite sides of said support, a rock lever having an arm and a head provided with a socket and obliquely mounted above said support in said yokes, an alining lug below said valve stem to engage said head and releasable holding devices engaging said water valve and said arm.

3. In dry pipe valves, a valve casing, a water valve in said casing, an air chamber to be connected to a distributing system, an air valve in said chamber provided with a stem, a support, brackets provided with yokes secured to said support, a rock lever having a head provided with a socket mounted in said yokes, an alining lug below said valve stem and releasable holding devices between said water valve and said rock lever.

4. In dry pipe valves, a casing, a valve, a chamber, a stem protruding from said chamber and controlled by the pressure within it, a support, brackets secured to said support and provided with yokes projecting on opposite sides of said support, a rock lever having an enlarged head provided with a socket and obliquely mounted above said support in said yokes, an alining lug engaging said head and located below said stem and releasable holding devices between said valve and said rock lever.

5. In dry pipe valves, a valve casing, a valve within said casing, a chamber, a stem protruding from said chamber and controlled by the pressure within it, a support below said stem, brackets secured to said support and provided with yokes projecting on opposite sides of said support and releasable holding devices engaging said valve and having a hook normally substantially in line with said support, a rock lever having an arm and a head provided with a socket on the opposite side from said arm, the said lever being obliquely mounted above said support in said yokes and an alining lug engaging said lever to prevent the irregular resetting of said valve.

6. In automatic valves, a valve, a chamber having a stem protruding therefrom and controlled by the pressure therein, a support in line with said stem, releasable holding devices for said valve comprising a member normally in line with said support, brackets secured to said support and provided with yokes projecting on opposite sides of said support, a rock lever having an arm for engagement with said member and provided with a socket on the other side from said arm, said lever being obliquely mounted with respect to said support in said yokes, and means to prevent the irregular resetting of said valve and lever.

7. In automatic valves, a chamber, a stem protruding from said chamber and controlled by the pressure therein, said stem being substantially in line with said support, releasable valve holding devices having a member normally in line with said support, a rock lever having an arm to be engaged by said member and a socket on the other side of said lever to engage said stem, said lever being obliquely mounted with respect to said support and provided with means to prevent its irregular resetting.

8. In automatic valves, a chamber, a stem protruding from said chamber and controlled by the pressure therein, releasable valve holding devices, a rock lever having an elongated rock shaft and provided with a member engaging said devices, and also provided with an enlarged head having a socket for engaging with said stem and an alining lug engaging said lever to prevent its irregular resetting.

9. In automatic valves, a chamber, a member controlled by the pressure in said chamber, releasable valve holding devices, a rock lever having an elongated rock shaft and engaging said devices, and provided with a laterally extending socket for engagement with said member, and means to prevent the irregular re-setting of said lever.

10. In automatic valves, a valve casing, a valve in said casing, an air chamber, a stem controlled by the pressure in said chamber, a rock lever having an elongated rock shaft revolubly mounted, and having a head provided with a laterally located socket to be engaged by said stem to prevent irregular resetting, and releasable holding devices between said valve and said rock lever.

JOHN R. HAMILTON.

Witnesses:
HARRY L. DUNCAN,
JESSIE B. KAY.